(12) United States Patent
Glasgow et al.

(10) Patent No.: US 9,128,784 B2
(45) Date of Patent: Sep. 8, 2015

(54) DATA TRANSFER USING A NETWORK CLIPBOARD

(75) Inventors: Jay Glasgow, Acworth, GA (US);
Adrian Popescu, Marietta, GA (US);
Ryan Patrick Swanson, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2212 days.

(21) Appl. No.: 11/745,913

(22) Filed: May 8, 2007

(65) Prior Publication Data
US 2008/0282180 A1   Nov. 13, 2008

(51) Int. Cl.
*G06F 3/048* (2013.01)
*G06F 9/54* (2006.01)
*H04L 29/08* (2006.01)

(52) U.S. Cl.
CPC ............... *G06F 9/543* (2013.01); *H04L 67/28* (2013.01); *H04L 67/2823* (2013.01); *H04L 67/2842* (2013.01)

(58) Field of Classification Search
CPC . G06F 9/543; H04L 67/2823; H04L 67/2842; H04L 67/28
USPC ........................................................ 715/770
See application file for complete search history.

(56) References Cited

U.S. PATENT DOCUMENTS

| 5,313,581 | A | * | 5/1994 | Giokas et al. | 719/329 |
| 5,386,564 | A | * | 1/1995 | Shearer et al. | 1/1 |
| 5,964,834 | A | * | 10/1999 | Crutcher | 709/213 |

OTHER PUBLICATIONS

The Complete Idiot's Guide to Windows XP, Paul McFedries, published Oct. 3, 2001, 9 pages.*
Gralla, Windows XP Power Hound by Preston Gralla, published by O'Reilly Media, Inc., Pub. Date: Sep. 2004; 6 pages.*

* cited by examiner

*Primary Examiner* — Andrey Belousov
(74) *Attorney, Agent, or Firm* — Hartman & Citrin LLC

(57) ABSTRACT

Systems, methods, and computer-readable media provide for the transfer of data between electronic devices utilizing a network clipboard. According to various embodiments described herein, a clipboard application residing on a host device associated with a user transmits data from a local clipboard of the host device to a remote network clipboard via a network. A clipboard application associated with a target device associated with the user transmits a request for the data stored on the network clipboard. A copy of the data associated with the user is retrieved from the network clipboard and stored on a local clipboard of the target device. The data is then copied to a target application. This process results from a single network clipboard transaction that includes a cut or copy action on the host device and a paste action on the target device.

18 Claims, 5 Drawing Sheets

DATA TRANSFER USING A NETWORK CLIPBOARD

TECHNICAL FIELD

This application relates generally to transferring data between network devices. More particularly, this application relates to copying data from a host device to a network clipboard and pasting the data within an application residing on a target device.

BACKGROUND

Transferring data between documents or between applications on a computing device is an action that is commonly performed utilizing a clipboard feature that is utilized by most computing device operating systems. Data to be transferred by a user from one document to an alternative location may be copied or cut from the document and placed on the clipboard, which involves storing the data in a designated temporary storage location. The user may then paste the data from the clipboard into the alternative location, which may be located within the same document, within another document associated with the same application, or within a document associated with a different application on the same computing device. When the user pastes the data to the new location, then the data is copied from the clipboard and inserted at the new location, leaving the data available on the clipboard for additional pasting actions. The copy, cut, and paste actions associated with a device clipboard allows for a simple and convenient method of transferring data between locations on a single computing device.

However, the typical process for transferring data between electronic devices is notably more complex. There are various methods for transferring data between electronic devices. One method commonly used is electronic mail (email). A user may copy and paste data from a document on a host device to an email application via the host clipboard. This data may then be sent to a target device using the email application. At the target device, the user must then open an email application, receive the email, open the email, copy the data to the target clipboard, and finally paste the data into the desired target application. This method involves a lengthy process, specifically two clipboard transactions (copy/paste from host application to email and copy/paste from email to target application) coupled with the email drafting, transmitting, and receiving process.

Another method for transferring data between electronic devices is to use a portable storage device such as an external disk drive, a universal serial bus (USB) flash memory device, a compact disk, or any other storage medium. To transfer data between devices using this method, a user must connect the storage device to the host device, save the desired data onto the storage device, disconnect the storage device from the host device, connect the storage device to the target device, and copy the data from the storage device to a target application on the target device. This process is tedious and requires the expense associated with purchasing storage hardware in addition to the host and target devices. Other methods for transferring data between electronic devices require the host and target devices to be within close proximity of one another, such as when transferring data using a physical connection between the host and target devices or when using a Wireless Personal Area Network (WPAN) connection between the devices.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and computer-readable media are provided herein for transferring data between electronic devices using a network clipboard. According to embodiments described herein, data is received from a local clipboard of a host device. The data is transmitted via a network to a remote storage location for storage on the network clipboard. The data on the network clipboard is then requested. As a result, a copy of the data on the network clipboard is received via the network from the remote storage location and stored on a local clipboard associated with a target device.

According to further embodiments of the disclosure provided herein, a determination is made as to whether the data is formatted for storage on the network clipboard. If the data is not formatted for storage on the network clipboard, then the data is properly formatted prior to storing the data at the remote storage location. Additionally, the compatibility of the data with the target device may be determined prior to storing the data on the local clipboard associated with the target device. If the data is not compatible with the target device, then the data may be converted to a compatible format, if possible, or an error message may be provided to the target device to inform a user of the incompatibility.

Additional embodiments provide a user interface within a host application that is executing on a host device. The user interface includes an option to transfer data from the host application to a network clipboard located at a remote storage location and an option to transfer data from the network clipboard to the host application. A selection to transfer data is received via the user interface and the data is transferred according to the transfer selection received via the user interface. The selection to transfer data may include a selection to copy data from the host application to the network clipboard or a selection to copy data from the network clipboard to the host application.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

DETAILED DESCRIPTION

The following detailed description is directed to systems, methods, and computer-readable media for utilizing a network clipboard to transfer data between electronic devices. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

As stated briefly above, embodiments described herein allow a user to cut or copy data from a document on a host device to a network clipboard, and then paste the data to a document on a target device. Only a single copy and paste action is performed by the user, without requiring the user to utilize an email or other messaging application, without requiring the two devices to be physically connected or in close proximity to one another, and without requiring any additional hardware. Utilizing the embodiments described herein, the user may transfer data between electronic devices efficiently and inexpensively. Throughout this disclosure, the term "electronic devices" includes any device capable of transmitting and receiving data to and from a network.

Figure 1:
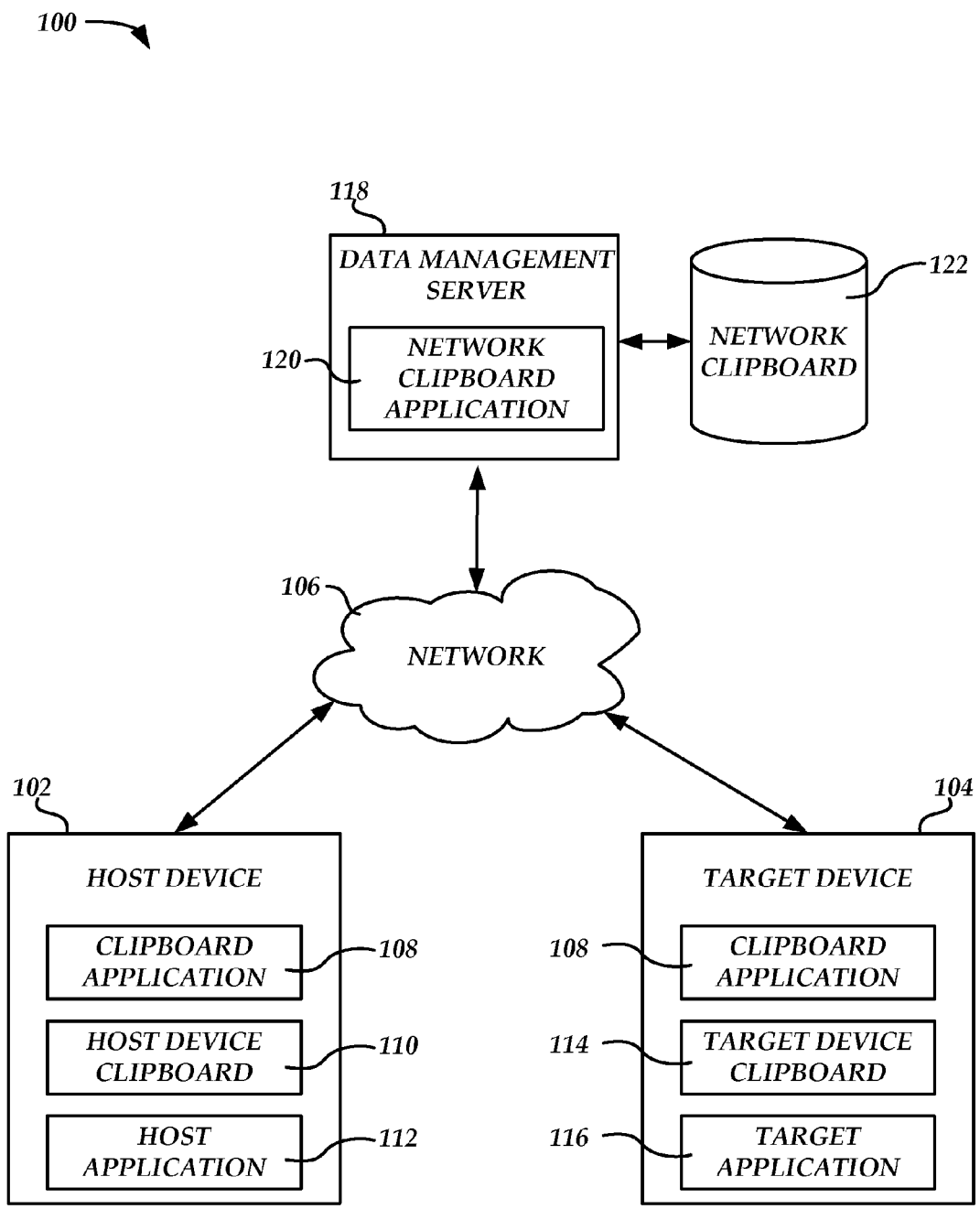
FIG. 1 is a block diagram showing elements of an illustrative network clipboard data transfer system according to various embodiments presented herein.

In the following detailed description, references are made to the accompanying drawings that form a part hereof, and which are shown by way of illustration specific embodiments or examples. Referring now to the drawings, in which like numerals represent like elements through the several figures, aspects of a network clipboard data transfer system and methodology for transferring data between electronic devices using a network clipboard will be described. FIG. 1 shows various elements of a network clipboard data transfer system 100 according to embodiments described herein. The network clipboard data transfer system 100 includes a host device 102, a target device 104, and a data management server 118.

It should be understood that the host device 102 and the target device 104 may each be any type of electronic device, including but not limited to a personal computer, a cellular telephone, a personal data assistant, a television, a set-top television box, a digital video recorder, a music or other audio device, a video game console, or any other entertainment or communications device. The elements of the network clipboard data transfer system 100 communicate with one another via a network 106. The network 106 may include the Internet such that the network communications occur via wireless or wired connections to the Internet. It should be understood that the network 106 may additionally or alternatively include a wireless network such as, but not limited to, a Wireless Local Area Network (WLAN) such as a WI-FI network, a Wireless Wide Area Network (WWAN), a WPAN such as BLUETOOTH, a Wireless Metropolitan Area Network (WMAN) such a WiMAX network, a cellular network, or a satellite network. The network 106 may also be a wired network such as, but not limited to, a wired Wide Area Network (WAN), a wired Local Area Network (LAN) such as the Ethernet, a wired Personal Area Network (PAN), or a wired Metropolitan Area Network (MAN).

The host device 102 includes a clipboard application 108, a host device clipboard 110, and a host application 112. According to embodiments described herein, the clipboard application 108 is an application that is operative to transfer data between the host device 102 or the target device 104 and a network clipboard 122, as well as to provide data validation and preparation functionality as described in further detail below. It should be understood that data may include any information that may be transferred to or from any electronic device, including but not limited to text, images, video, and any other media or combination thereof. The host device clipboard 110 is a local clipboard for temporarily storing data that has been cut or copied from a document created by the host application 112. Data stored on the host device clipboard 110 may be pasted into one or more documents created by the host application 112 or created by any other application residing on the host device 102. As will be described in detail below, the data stored on the host device clipboard 110 may also be transferred by the clipboard application 108 to the network clipboard 122 for use by the target device 104. It should be appreciated that the host application 112 may include any type and number of applications that may be used to create data. Examples include but are not limited to word processing applications, spreadsheet applications, email and other messaging applications, image management and editing applications, accounting applications, database applications, drafting applications, and presentation creation applications.

The target device 104 also includes the clipboard application 108. The clipboard application 108 within the target device 104 shares the same reference number as the clipboard application 108 within the host device 102 to show that although each clipboard application 108 may be configured to execute with a different operating system according to the electronic device on which it is installed, each clipboard application 108 performs similar data transfer functions for the corresponding electronic device. For example, the clipboard application 108 executing on a cellular telephone allows a user to copy data from the cellular telephone to the network clipboard 122 and to paste data from the network clipboard 122 into an application executing on the cellular telephone just as the clipboard application 108 and on a personal computer allows the user to copy data from the personal computer to the network clipboard 122 and to paste data from the network clipboard 122 into an application executing on the personal computer. Similar to the host device 102, the target device 104 includes the target device clipboard 114 for temporarily storing data from a document created by the target application 116. As stated above with respect to the host application 112, the target application 116 may include any type and number of applications that may be used to create data.

The data management server 118 is a server computer that includes a network clipboard application 120 for communicating with the clipboard application 108 of the host device 102 and the target device 104, and for storing and retrieving data from the network clipboard 122. According to one embodiment of the disclosure presented herein, the clipboard application 108 of the host device 102 and the clipboard application 108 of the target device 104 perform all of the data transmission, validation, and preparation functions described herein. In this embodiment, each clipboard application 108 transmits instructions and requests to the network clipboard application 120 for storing and retrieving data to and from the network clipboard 122. The network clipboard application 120 executes the data storing and retrieval instructions sent by each clipboard application 108. Each clipboard application 108 is operative to perform any additional data validation and preparation procedures, as will be described below with respect to FIGS. 2-4.

However, it should be understood that the network clipboard application 120 may alternatively perform some or all of the data validation and preparation functionality described herein. In this alternative embodiment, the clipboard application 108 of the host device 102 may be operative to transmit any data stored in the host device clipboard 110 to the data management server 118, leaving any data validation and preparation to the network clipboard application 120. Similarly, in this alternative embodiment, the clipboard application 108 of the target device 104 may be operative to transmit a request for data to the data management server 118 upon detecting a paste action by a user of the target application 116 and to store any resulting data that is received from the data management server 118 in the target device clipboard 114.

The network clipboard 122 is a temporary storage location for data that is transmitted from the clipboard application 108 of the host device 102. It should be appreciated that the network clipboard 122 may be a database that is connected to or remote from the data management server 118, or may be a storage medium located within the data management server 118.

Figure 2:
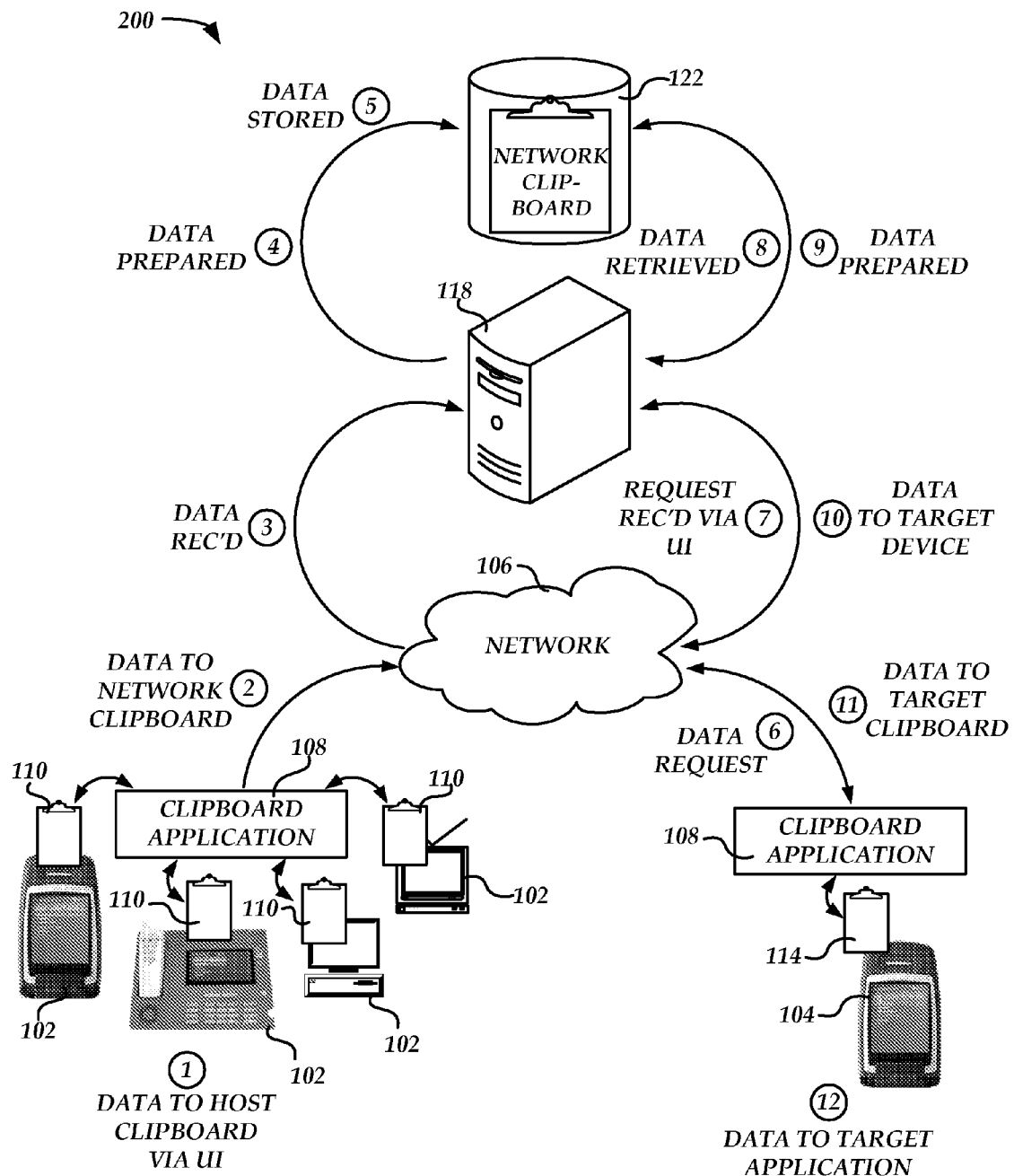
FIG. 2 is a process diagram showing an illustrative flow of data through elements of a network clipboard data transfer system according to various embodiments presented herein.

Turning now to FIG. 2, a data transfer process 200 from the host device 102 to the target device 104 is illustrated according to various embodiments described herein. It should be understood that although the data transfer process 200 will be described according to Actions 1-12 as labeled in FIG. 2, the data transfer process 200 is not limited to the labeled actions or the order in which the actions are labeled and described. First, at Action 1, data is copied or cut to the host device clipboard 110 from the host application 112 running on the host device 102. The copy or cut action may be received via a user interface within the host application 112. The user interface is provided by the clipboard application 108. FIG. 2 illustrates various examples of the host device 102. The clipboard application 108 running on the host device 102 detects that data has been copied to the host device clipboard 110 and accesses the data via an Application Program Interface (API). Alternatively, the operating system of the host device 102, the host application 112 from which the data is copied, or the clipboard application 108 may provide the user with an option to copy or cut data to the host device clipboard 110 or the network clipboard 122. For example, the clipboard application 108 may provide the user with a common user interface on the host device 102 and the target device 104 for copying, cutting, and pasting data to and from the network clipboard 122.

At Action 2, the clipboard application 108 transmits the data to the data management server 118 for storage on the network clipboard 122. The data is transmitted via the network 106 using a host transport. According to one embodiment, the host transport is an Internet Protocol (IP) transport capable of transmitting the data over the Internet using any appropriate transport medium. The data is received by the data management server 118 at Action 3. The data is prepared for storage on the network clipboard 122 at Action 4. Data preparation may include any number of validation and/or modification processes that may be necessary or desired when storing the data on the network clipboard 122. For example, due to storage limitations on the network clipboard 122, the amount of data to be stored might be required to be less than a predetermined size threshold. In this scenario, the clipboard application 108, either prior to transmitting the data to the network clipboard 122 or after receiving a message from the data management server 118 as to the predetermined size threshold, compares the size of the data to the predetermined size threshold to determine whether the amount of data is too large for storage on the network clipboard 122.

If the amount of data is too large, the clipboard application 108 may reformat the data to satisfy the size restriction if possible. If not possible, an error message may be returned to the host device 102 to be displayed for the user. For example, if an extremely large image file is placed on the host device clipboard 110 and is subsequently transmitted to the data management server 118, the image file may require resizing or a reduction in resolution prior to storage on the network clipboard 122 if the network clipboard 122 contains a file size restriction that prohibits the image file to be stored in its original format. According to one embodiment of the disclosure provided herein, another data preparation process includes translating the data to an alternative state prior to storing the data on the network clipboard 122. For example, data that is copied from a host application 112 that is controlled by one operating system may not be usable with an target application 116 that is controlled by a different operating system without some degree of data translation. The clipboard application 108 will translate the data to a neutral state or format that is recognizable and usable to all operating systems when possible.

In order to perform the data validation and later the data viability (discussed below with respect to Action 9), the clipboard application 108 may need specific information about the data, the host device 102, and/or the target device 104. This information is stored with the data as a metadata. The metadata may provide any amount and type of information pertinent to copying, storing, and pasting the data from the host device 102 to the target device 104. Examples include but are not limited to information about the operating system of the host device 102, the host application from which the data was obtained, the host device 102, and the amount of data being transferred to the network clipboard 122.

Additionally, the metadata may include a user identifier. The user identifier identifies the user that has copied the data to the network clipboard 122. This identifier is used by the clipboard application 108 associated with the target device 104 when requesting the data. When a request is made to paste data from the network clipboard 122 into the target application 116, the network clipboard 122 is searched by the clipboard application 108, or alternatively by the network clipboard application 120, for metadata having a matching user identifier. When found, the corresponding data is retrieved for transfer to the target device 104. In this manner, a user may associate multiple electronic devices with a user identifier to allow the user to paste associated data on multiple devices. According to one embodiment, multiple users may associate with a single user identifier to allow any one user to copy information to the network clipboard 122 and any other user associated with the same user identifier to paste the information into the target device 104.

An example of this embodiment is where family members may each have a personal user identifier and a family user identifier. Data that is copied to the network clipboard 122 using a personal user identifier may only be pasted to the target device 104 by the same user that copied the information to the network clipboard 122. However, data that is copied to the network clipboard 122 using the family user identifier may be pasted to the target device 104 associated with any family member that chooses to paste data from the network clipboard 122 using the family user identifier. One family member may copy a family picture to the network clipboard 122 and all other family members may paste the picture to a cellular telephone, television, or any other target device 104 associated with the family user identifier. The clipboard application 108 may provide the user with the choice to copy, cut, or paste using a personal user identifier or a family user identifier via a user interface on the host device 102 and the target device 104.

At Action 5, the data management server 118 stores the data and corresponding metadata on the network clipboard 122. Now that the data is stored on the network clipboard 122, the user may paste the data into the target application 116 on the target device 104. At Action 6, clipboard application 108 sends a request for the data to the data management server 118. This request may have been initiated by the user via the user interface provided by the clipboard application 108, or via the target application 116. As an example, the request may be initiated via a "paste" button provided by the clipboard application 108 via the target application 116. The request is received at the data management server 118 at Action 7. At Action 8, the data management server 118 retrieves a copy of the requested data utilizing the user identifier as discussed above. The data remains stored on the network clipboard 122 until it is overwritten by another copy or cut action by the host device 102. In this manner, the data may be pasted repeatedly on one or more target devices 104.

At Action 9, the clipboard application 108 prepares the data for use on the target device 104. This preparation includes a determination as to whether the data is viable on the target device 104. For example, the data may be associated with the host application 112 that does not exist and does not have any applicable alternatives on the target device 104. For example, an EXCEL spreadsheet may not be viewable on a television that does not have an application that is capable of opening a spreadsheet. Additionally, the data may not be usable with the operating system running on the target device 104 if a translation to a neutral state was not possible before storing the data on the network clipboard 122. The data preparation may also include translating the data to an end state that is compatible with the operating system associated with the target device 104. If the data was translated into a neutral state prior to storage on the network clipboard 122, then the clipboard application 108 may further translate the data to a format that is compatible with the operating system associated with the target device 104.

The data is transmitted via the network 106 to the target device 104 at Action 10. At Action 11, the clipboard application 108 copies the data to the target device clipboard 114. If the clipboard application 108 previously determined that the data was not viable, then the clipboard application 108 provides an error notification and/or an explanation regarding the incompatibility of the data with the target device 104. At Action 12, the clipboard application 108 copies the data from the target device clipboard 114 to the target application 116. If the target application 116 is not running, the clipboard application 108 may launch the target application 116 and then paste the data.

Rather than the clipboard application 108 performing the data validation determination, viability determination, and any modification procedures described above, it should be understood that the network clipboard application 120 may perform these procedures, or alternatively, the clipboard application 108 and the network clipboard application 120 may work in conjunction to perform these procedures prior to storing the data on the network clipboard 122 and prior to pasting the data onto the target device clipboard 114.

Figure 3:
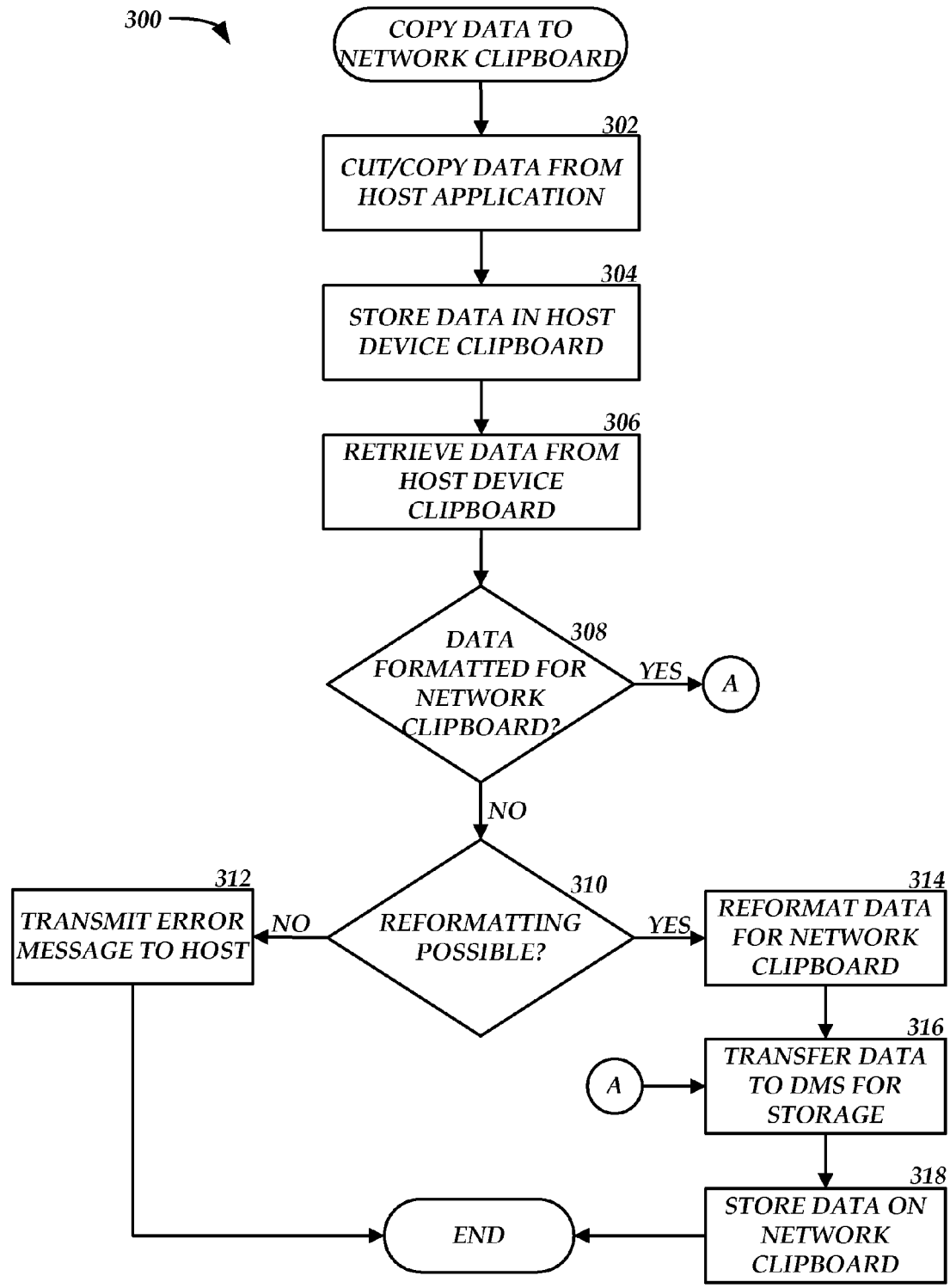
FIG. 3 is a flow diagram illustrating a method for transferring data from a host device to a network clipboard according to various embodiments presented herein.

Turning now to FIG. 3, an illustrative routine 300 will be described for transferring data from the host device 102 to the network clipboard 122 according to various embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 300 begins at operation 302, where a user cuts or copies data from the host application 112 running on the host device 102. This data may be cut or copied from the host application 112 via a user interface associated with either the host application 112 or with the clipboard application 108. The host application 112 stores the data on the host device clipboard 110 at operation 304. From operation 304, the routine 300 continues to operation 306, where the clipboard application 108 retrieves the data from the host device clipboard 110 via an API. The routine 300 continues to operation 308, where the clipboard application 108 determines whether the data is formatted for the network clipboard 122. As discussed above, this determination may include determining whether the amount of data does not exceed a predetermined threshold and determining whether a state translation is necessary. If it is determined that the data is formatted for the network clipboard 122, then the routine 300 proceeds to operation 316 and continues as described below. However, if at operation 308, the clipboard application 108 determines that the data is not properly formatted for storage on the network clipboard 122, then the routine 300 continues to operation 310, where the clipboard application 108 makes a determination as to whether reformatting the data is possible.

If the clipboard application 108 determines at operation 310 that reformatting the data is not possible, then the routine 300 proceeds to operation 312, where the clipboard application 108 transmits an error message to the host device 102 and the routine 300 ends. However, if the clipboard application 108 determines at operation 310 that reformatting the data is possible, then the routine 300 proceeds to operation 314, where the clipboard application 108 reformats the data for storage on the network clipboard 122. From operation 314, the routine 300 continues to operation 316, where the clipboard application 108 transfers the data to the data management server 118 for storage on the network clipboard 122. The routine 300 continues from operation 316 to operation 318, where the clipboard application 108, or the network clipboard application following instruction from the clipboard application 108, stores the data on the network clipboard 122 and the routine 300 ends.

Figure 4:
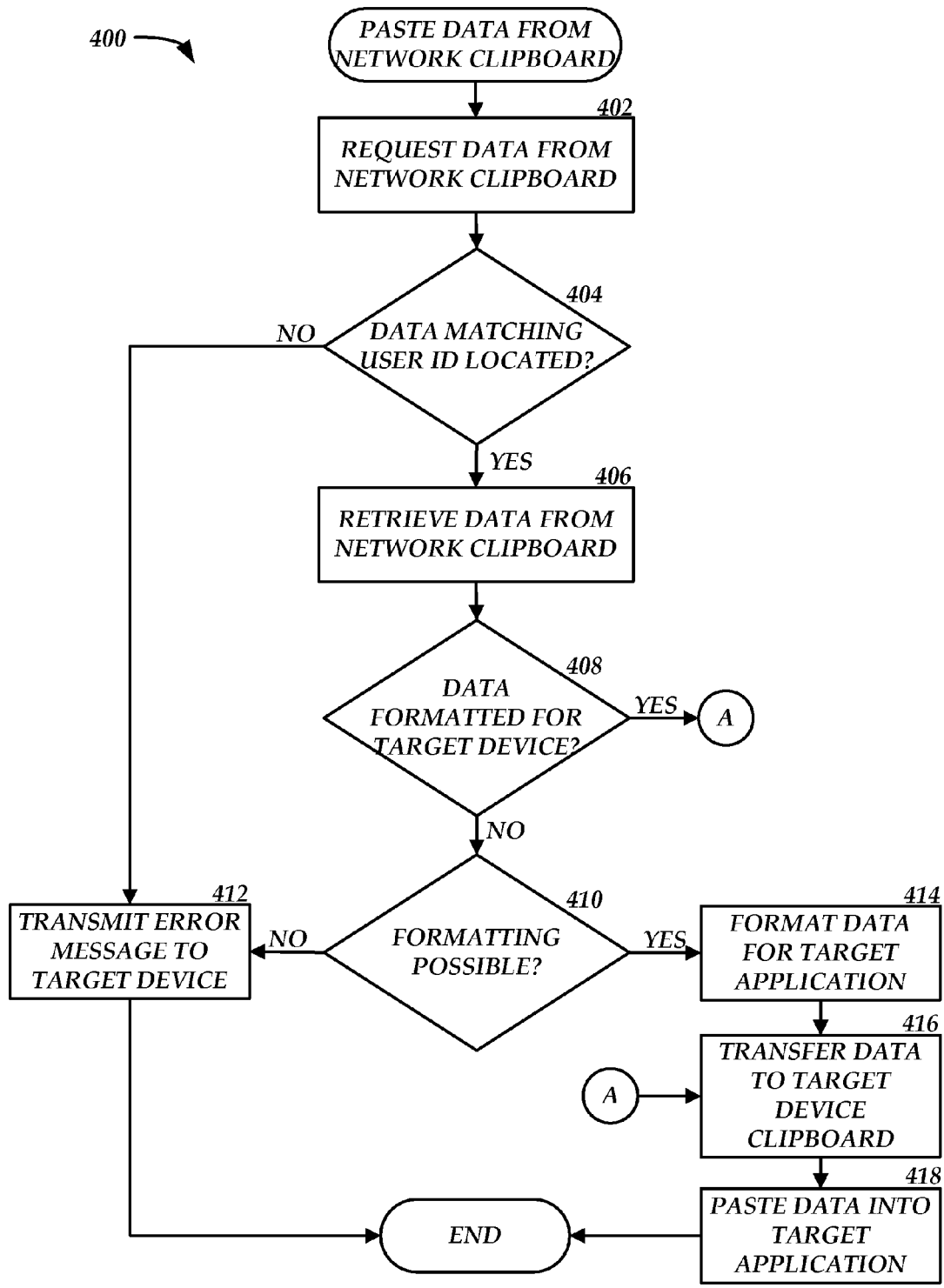
FIG. 4 is a flow diagram illustrating a method for transferring data from a network clipboard to a target device according to various embodiments presented herein.

Turning to FIG. 4, an illustrative routine 400 will be described for transferring data from the network clipboard 122 to the target device 104 according to various embodiments presented herein. The routine 400 begins at operation 402, where the clipboard application 108 associated with the target device 104 transmits a request for data stored on the network clipboard 122 to the data management server 118. From operation 402, the routine 400 continues to operation 404, where the clipboard application 108 determines whether the requested data having metadata with a user identifier that matches the user identifier associated with the target device 104 can be located on the network clipboard 122. If the requested data is not located, then the routine 400 proceeds to operation 412, where the clipboard application 108 transmits an error message to the target device 104 and the routine 400 ends.

However, if at operation 404, the clipboard application 108 locates data associated with the user identifier corresponding to the target device 104, then the routine 400 continues to operation 406, where a copy of the data is retrieved from the network clipboard 122. It should be appreciated that the data search and retrieval may be performed by the clipboard application 108, or alternatively by the network clipboard application according to instructions from the clipboard application 108 that are transmitted with the data request. It should also be understood that prior to retrieving the data from the network clipboard 122, the clipboard application 108 or the network clipboard application 120 may perform any type and quantity of authentication procedures to ensure that the requesting user is authorized to receive the requested information.

From operation 406, the routine 400 continues to operation 408, where the clipboard application 108 determines whether the data is formatted for the target device 104. As discussed above, this determination may include determining whether the data is viable on the target device 104 due to differences in operating systems or applications operating on the host device 102 and the target device 104. If it is determined that the data is viable for the target device 104, then the routine 400 proceeds to operation 416 and continues as described below. However, if at operation 408, the clipboard application 108 determines that the data is not properly formatted for the target device 104, then the routine 400 continues to operation 410, where the clipboard application 108 makes a determination as to whether reformatting the data is possible.

If the clipboard application 108 determines at operation 410 that reformatting the data is not possible, then the routine 400 proceeds to operation 412, where the clipboard application 108 transmits an error message to the target device 104 and the routine 400 ends. However, if the clipboard application 108 determines at operation 410 that reformatting the data is possible, then the routine 400 proceeds to operation 414, where the clipboard application 108 reformats the data for use on the target device 104. From operation 414, the routine 400 continues to operation 416, where the clipboard application 108 transfers the data to the target device clipboard 114 for temporary storage. The routine 400 continues from operation 416 to operation 418, where the clipboard application 108, or the target application 116, pastes the data from the target device clipboard 114 to the target application 116 and the routine 400 ends.

Figure 5:
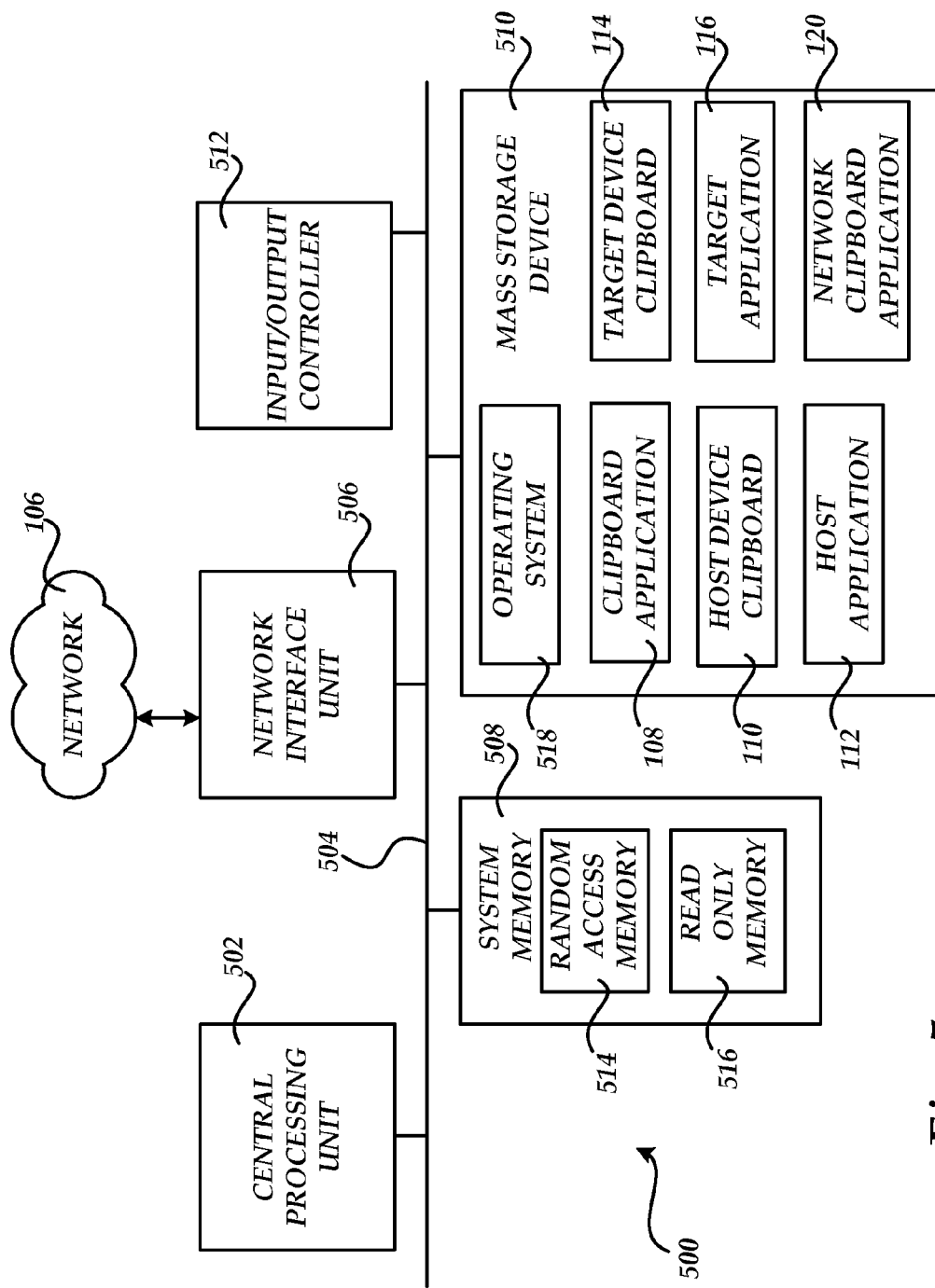
FIG. 5 is a computer architecture diagram showing a computer architecture suitable for implementing the various computer systems described herein.

Referring now to FIG. 5, an illustrative computer architecture for the host device 102, the target device 104, or the data management server 118 is shown. The computer architecture is of a computer 500 utilized in the various embodiments. The computer architecture shown in FIG. 5 illustrates a conventional desktop, laptop computer, or server computer. The computer architecture shown in FIG. 5 includes a central processing unit 502 (CPU), a system memory 508, including a random access memory 514 (RAM) and a read-only memory (ROM) 516, and a system bus 504 that couples the memory to the CPU 502. A BIOS containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through the network 106. As described above with respect to FIG. 1, the network 106 may include a wireless network such as, but not limited to, a WLAN such as a WI-FT network, a WWAN, a WPAN such as BLUETOOTH, a WMAN such a WiMAX network, a cellular network, or a satellite network. Alternatively, the network 106 may be a wired network such as, but not limited to, a wired WAN, a wired LAN such as the Ethernet, a wired PAN, or a wired MAN. The network 106 may include the Internet such that the elements of the network clipboard data transfer system 100 communicate with one another via wireless or wired connections to the Internet.

The computer 500 may connect to the network 106 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including the operating system 518 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that the implementations presented herein may be embodied using a desktop or laptop computer or any other computing devices or systems or combinations thereof.

The mass storage device 510 and RAM 514 may also store one or more program modules. In particular, the mass storage device 510 and the RAM 514 may store the clipboard application 108, host device clipboard 110, and host application 112 when representing the host device 102; the clipboard application 108, target device clipboard 114, and target application 116 when representing the target device 104; and the network clipboard application 120 when representing the data management server 118, as well as any other program modules described above with respect to FIG. 1. Based on the foregoing, it should be appreciated that systems, methods, and computer-readable media for transferring data using a network clipboard 122 are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method comprising:
receiving, via a network and at a data management server comprising a processor, data from a first local clipboard of a host device, wherein the host device executes a first clipboard application that obtains the data from a document at the host device;
determining, at the data management server, if the data is formatted for storage on a network clipboard comprising a data storage device in communication with the data management server;
if the data is formatted for storage on the network clipboard, storing, by the data management server, the data on the network clipboard;
receiving, at the data management server, a request for the data stored on the network clipboard, the request being received from a target device that executes a second clipboard application; and
in response to the request,
retrieving a copy of the data from the network clipboard, and
forwarding, via the network, the copy of the data to the target device, wherein the second clipboard application stores the data on a second local clipboard of the target device, wherein the data comprises an identifier associated with a user of the host device, and wherein the copy of the data is stored on the second local clipboard of the target device if the identifier associated with the user of the host device matches an identifier associated with a user of the target device.

2. The method of claim 1, further comprising formatting the data for storage on the network clipboard and storing the data on the network clipboard, in response to determining that the data is not formatted for storage on the network clipboard.

3. The method of claim 2, wherein determining if the data is formatted for storage on the network clipboard comprises determining whether a state translation is required, and wherein formatting the data for storage on the network clipboard comprises translating the data to a different state prior to storing the data on the network clipboard.

4. The method of claim 1, further comprising:
determining whether the data exceeds a predetermined quantity threshold;
if the data exceeds the predetermined quantity threshold, providing the host device with an error message comprising an indication that the data exceeds the predetermined quantity threshold; and
if the data does not exceed the predetermined quantity threshold, storing the data on the network clipboard.

5. The method of claim 1, further comprising:
determining if the data is compatible with the target device; and
if the data is not determined to be compatible with the target device, providing the target device with an error message comprising an indication that the data is not compatible with the target device.

6. The method of claim 5, wherein determining if the data is compatible with the target device comprises comparing metadata corresponding to the data with characteristics of the target device.

7. The method of claim 5, wherein providing the target device with the error message comprises:
determining if the data can be converted to a format that is compatible with the target device; and
if the data can be converted to the format that is compatible with the target device, converting the data to the format that is compatible.

8. The method of claim 1, wherein the network comprises a host transport for transmitting the data between the host device and the network clipboard and a target transport for transmitting the data between the network clipboard and the target device, and wherein the host transport and the target transport comprise different types of transmission media.

9. A computer-readable medium having computer-executable instructions stored thereon that, when executed by a processor, cause the processor to perform operations comprising:
receiving, via a network and at a data management server, data from a first local clipboard of a host device that executes a first clipboard application, wherein the first clipboard application obtains the data from a document at the host device;
determining if the data is formatted for storage on a network clipboard comprising a remote storage device in communication with the data management server;
if the data is formatted for storage on the network clipboard, storing the data on the network clipboard;
receiving, at the data management server and from a target device that executes a second clipboard application, a request for the data on the network clipboard;
in response to receiving the request,
retrieving a copy of the data from the network clipboard, and
forwarding, via the network, the copy of the data to the target device, wherein the second clipboard application stores the data on a second local clipboard of the target device, wherein the data comprises an identifier associated with a user of the host device, and wherein the copy of the data is stored on the second local clipboard if the identifier associated with the user of the host device matches a stored identifier associated with the user of the target device.

10. The computer-readable medium of claim 9, wherein the computer-executable instructions, when executed by the processor, cause the processor to perform operations further comprising:
formatting the data for storage on the network clipboard, in response to determining that the data is not formatted for storage on the network clipboard.

11. The computer-readable medium of claim 9, wherein the computer-executable instructions, when executed by the processor, cause the processor to perform operations further comprising:
  determining if the data is compatible with the target device; and
  if the data is not determined to be compatible with the target device, providing the target device with an error message comprising an indication that the data is not compatible with the target device.

12. The computer-readable medium of claim 11, wherein providing the target device with the error message comprises:
  determining if the data can be converted to a format that is compatible with the target device; and
  if the data can be converted to the format that is compatible with the target device, converting the data to the format that is compatible.

13. The computer-readable medium of claim 9, wherein the network comprises the Internet, a host Internet Protocol transport for transmitting the data between the host device and the network clipboard, and a target Internet Protocol transport for transmitting the data between the network clipboard and the target device, and wherein the host Internet Protocol transport and the target Internet Protocol transport comprise different types of transmission media.

14. A data management server comprising:
  a processor; and
  a memory that stores computer-executable instructions that, when executed by the processor, cause the processor to perform operations comprising
    receiving, via a network, data from a first local clipboard of a host device that executes a first clipboard application, wherein the host device obtains the data from a document at the host device,
    determining if the data is formatted for storage on a network clipboard comprising a data storage device in communication with the data management server,
    storing the data on the network clipboard if the data is formatted for storage on the network clipboard,
    receiving a request for the data on the network clipboard, the request being received from a target device that executes a second clipboard application,
    retrieving a copy of the data from the network clipboard in response to receiving the request, and
    forwarding the copy of the data to the target device, wherein the second clipboard application stores the data on a second local clipboard of the target device, wherein the data comprises an identifier associated with a user of the host device, and wherein the copy of the data is stored on the second local clipboard of the target device if the identifier associated with the user of the host device matches a stored identifier associated with the user of the target device.

15. The data management server of claim 14, wherein the host device executes a host application that:
  copies data from the first local clipboard of the host device,
  formats the data for storage on the network clipboard, and
  transmits the data for storage on the network clipboard.

16. The data management server of claim 14, wherein the target device executes a target application that:
  requests the copy of the data from the network clipboard,
  receives the copy of the data from the network clipboard,
  formats the copy of the data for storage on the second local clipboard of the target device, and
  stores the copy of the data on the second local clipboard of the target device.

17. The data management server of claim 14, wherein the computer-executable instructions, when executed by the processor, cause the processor to perform operations further comprising:
  determining if the data is compatible with the target device; and
  providing the target device with an error message in response to determining that the data is not compatible with the target device, the error message comprising an indication that the data is not compatible with the target device.

18. The method of claim 1, wherein the document is created at the host device via a host application executed by the host device.

* * * * *